April 7, 1925.
J. S. BOOTH
VEHICLE SPRING
Filed March 12, 1924
1,532,678
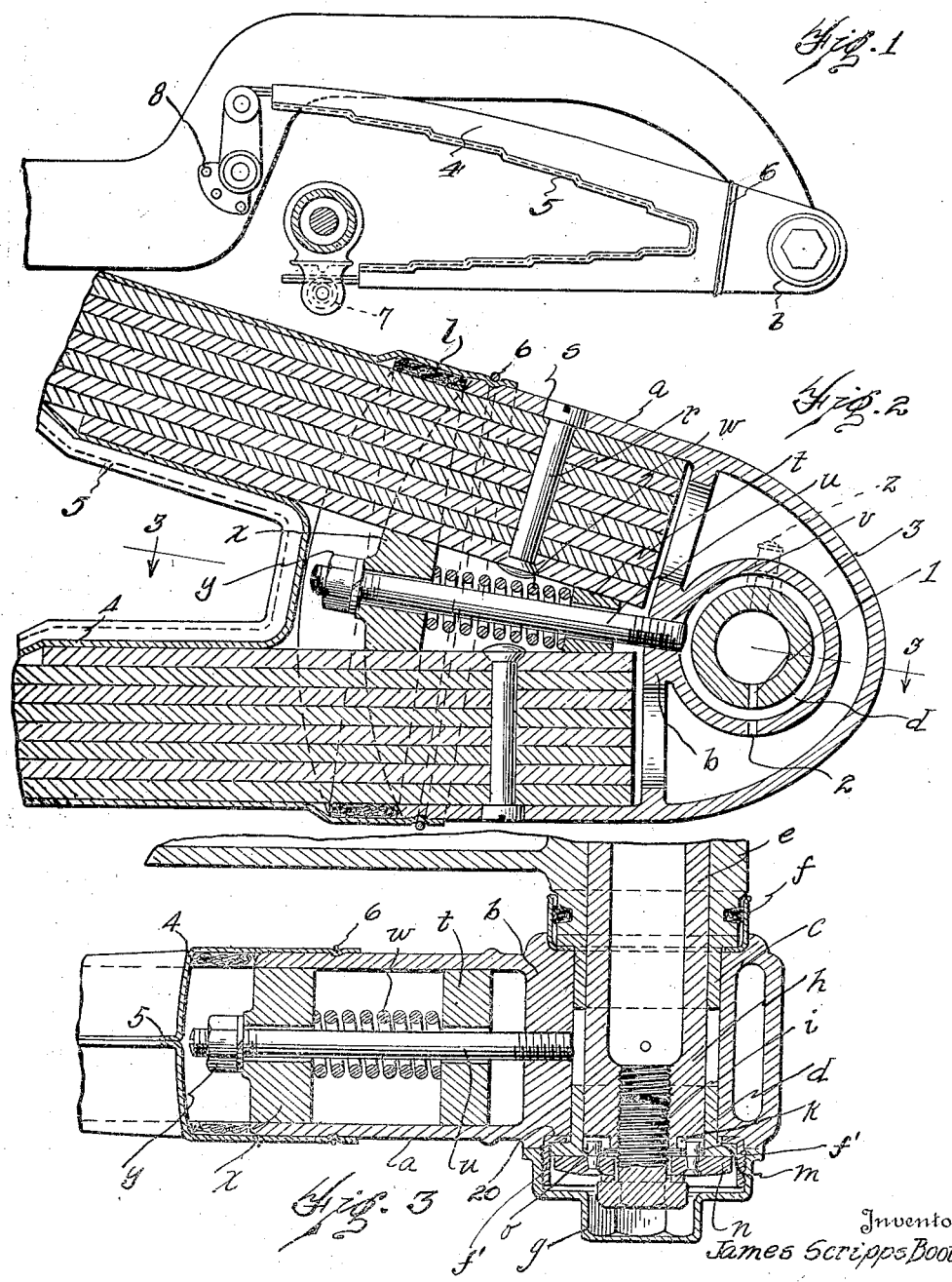
Inventor
James Scripps Booth
By Stuart E. Barnes
Attorney Patented Apr. 7, 1925.

1,532,678

UNITED STATES PATENT OFFICE.

JAMES SCRIPPS BOOTH, OF DETROIT, MICHIGAN.

VEHICLE SPRING.

Application filed March 12, 1924. Serial No. 698,647.

*To all whom it may concern:*

Be it known that I, JAMES SCRIPPS BOOTH, a citizen of the United States, residing at Detroit, in the county of Wayne and State of Michigan, have invented certain new and useful Improvements in Vehicle Springs, of which the following is a specification.

This invention relates to leaf spring assemblies and has for its object what I believe to be a new arrangement for anchoring the bulky end of the leaf spring so that it may be easily and securely disassembled from the anchor when desired. The anchor design is particularly applicable to the so-called hairpin type of spring.

Another object of the invention is to provide suitable lubrication for the springs by employing a cross connecting tube and using this as an oil reservoir. The spring anchor is provided with suitable passageways through which the oil may be fed by gravity, capillary action and splash to the ends of the leaves. There is employed preferably with each spring, a suitable oil boot.

In the drawings:

Fig. 1 is a side elevation of one of my improved springs at the rear of the chassis frame.

Fig. 2 is a longitudinal section taken through the thick ends of the spring.

Fig. 3 is a cross section taken on the line 3—3 of Fig. 2.

The spring shown here is the hairpin type of spring but obviously this form of anchor could be used with a simple straight or semi-elliptical spring. An anchor shell or casing $a$ is employed. This is a casting here shown adapted to the hairpin type of spring and consequently having a mouth large enough to take the two heavy ends of the two legs of the hairpin spring. The casting has a hub $b$ arranged to take the flanged bushings $c$ and $d$ which fit on the end of the cross tube $e$. This cross tube here is stationary in the chassis and the hairpin type of spring is arranged to pivot on it, although obviously the casing could be keyed or pinned to the tube and the tube used as a torque tube for transmitting the torque of one spring to the spring at the opposite side of the car. An oil-retaining collar $f$ is provided on the inside of the casing and a cap $g$ is provided on the outer side of the casing. A bolt $i$ is adapted to be turned into the threaded end of the cross tube. The end of the tube is slotted as at $k$; a plurality of shims $m$ are fitted over the end of the tube. The thrust flange $n$ may then be fitted over the end of the bushing $b$ with the pins $o$ fitting into the slot. This thrust flange is jammed up against the flange of the bushing $d$ by the bolt which screws into the internal threads at the end of the tube $e$. The dust cap $g$ is then fitted over the outside of the parts and screws onto the oil-retaining collar $f'$ which has a flange adapted to fit between the flange of the bushing $d$ and the hub $b$ of the casting. This assembly permits the tube and the hub of the anchor casing to have relative rotational movement.

The assembly of the spring legs into the anchor is one of the features of the invention. The anchor casing has a wide outwardly diverging mouth. The large ends of the springs are engaged in this mouth far enough so that the pin $r$ which fastens the leaves together has its head register with the hole $s$ in the anchor casing. Between the two spring ends is the spring-thrust shim $t$; threaded through this is the threaded stud $u$ which is turned into the tapped hole $v$ in the hub of the casing. The coil thrust spring $w$ engages the shim $t$. With the spring ends now in proper position and with the pins $r$ ready to enter the holes $s$ the wedge or shim $x$ may be forced between the spring legs by means of turning the nut $y$ onto the threaded end of the stud. This completes the assembly and securely locks the spring ends in the anchor casing, for the pin heads $r$ engage in the holes $s$. This makes a very neat and easy assembly for by simply releasing the nut $y$ the springs themselves may be released from the anchor without in any way disturbing the connection between the cross tube and the anchor which is provided with various packing devices to hold the oil in.

The cross tube $e$ is provided with a suitable oil filling fixture such as $z$. Light or semi-heavy oil may be introduced through this fixture and retained in the cross tube. It will be therefore apparent that the oil through this single fixture will lubricate both the bearings at the rear of each spring, and at the same time by perforating the tube as at 1, and the anchor casing hub as at 2, that oil may flow into the interior chamber 3 of the anchor casing. It will here reach the ends of the leaf springs and if a light grade of oil is used it will readily creep in between the leaves as oil has great capacity for creeping by capillary action. A wick 1 will feed the oil around the spring.

Preferably, in order to prevent the escaping of the oil, I use a suitable boot 4 which is preferably of leather but may be of any other suitable material. This is stitched or laced together along the edge 5, and is clamped to the outside of the anchor casing by a ring 6.

The front end of the lower leg of the spring passes freely over the roller 7. The upper spring is at its forward end shackled to the bracket 8. Obviously, with this hook-up it is necessary to drive through the torque tube (not shown). However, the special form of hook-up has nothing in particular to do with the invention here claimed. This is directed to the lubricating fixture and the character of the anchor.

What I claim is:

1. In a spring assembly, the combination of an anchor, casing, a leaf spring having its large end fitting into an opening in the anchor casing, a shim for clamping such end in the anchor casing, and means for drawing the shim down to wedge the end of the spring in the anchor casing.

2. In a spring assembly, the combination of a hollow anchor casing provided with an open mouth, a leaf spring having its large end arranged to fit into the mouth of the casing, and a rigid non-deformable shim which may be forced down longitudinally of the spring to wedge the end of the spring in the anchor casing.

3. In a spring assembly, the combination of a hollow anchor casing provided with an open mouth, a leaf spring having its large end fitting into the mouth of the casing, a shim which can be drawn down longitudinally of the spring to jam the end of the spring against the end of the casing, and means for drawing the shim down.

4. In a spring assembly, the combination of a hollow anchor casing with an open mouth, a leaf spring having its large end fitting into the open mouth, and means for clamping the spring in the casing comprising a spring-thrust shim and a mechanically thrust shim.

5. In a spring assembly, the combination of a hollow anchor casing with an open mouth, a leaf spring having its large end fitting into the mouth, and means for clamping the end of the spring in such casing comprising a shim and a stud and nut for drawing down the shim longitudinally of the spring.

6. In a spring assembly, the combination of a hollow anchor casing with an open mouth, a leaf spring having its large end fitting into the said mouth, and means for clamping the spring end in the casing comprising a nut and threaded stud, two shims threaded onto the stud, one of the same spring-thrust into position and the other drawn down by the nut.

7. In a spring assembly, the combination of a hollow unit anchor casing provided with an open mouth, a pair of springs having their large ends fitting into the said mouth, and wedging means for driving in between the spring ends longitudinally of the springs to anchor the ends of the spring in said casing.

8. In a spring assembly, the combination of a hollow casing provided with an open mouth, a pair of leaf springs having their large ends fitting into the open mouth of the casing, a shim fitting between the spring ends, and means thrusting longitudinally of the springs for drawing the shims down to clamp the spring ends to the anchor casing.

9. In a spring assembly, the combination of a hollow anchor casing provided with an open mouth, said casing provided with a pin hole, a leaf spring having its large end fitting into the said casing and provided with a pin having a projecting end arranged to register with said pin hole, and a shim which may be forced in under the spring for clamping the spring to the anchor casing and forcing said pin end into said hole.

10. In a spring assembly, the combination of a hollow anchor casing provided with an open mouth, a pair of leaf springs having large ends fitting into said mouth, a threaded stud and nut, and a pair of shims threaded onto the said stud, the inner shim being spring-thrust by a coil spring coiled about the stud, and the outer shim being forced down by turning said nut on the threaded stud to clamp the two spring ends within the anchor casing.

11. In a spring suspension, the combination of a hollow cross tube provided with means for the introduction of a lubricant, a hollow spring anchor supported on the end of the cross tube and suitably packed in relation thereto, the said parts being provided with suitable passageways to connect the interior of the tube with the hollow interior of the spring anchor, and one or more springs having their ends anchored in said anchor and in position to come in contact with the oil fed from the cross tube as the reservoir.

12. In a spring suspension, a hollow cross tube provided with means for the introduction of a lubricant and arranged to reservoir the lubricant, a spring anchor hollow on its interior and provided with a hub arranged to rock on the end of the cross tube, and a leaf spring having its large end anchored in said casing, the said cross tube in the casing provided with suitable ports and passageways so that oil may flow from the interior of the tube onto the hub bearing and also reach the leaves of the spring.

13. In a spring suspension, the combination of a hollow cross tube, a hollow anchor casing supported thereon, a leaf spring having the large end secured in said anchor, means by which lubricant may be introduced into the interior of the cross tube, a lubricant-retaining boot secured around the spring and the casing, said casing and tube provided with suitable ports and passageways whereby oil reservoired in the cross tube may reach the leaves of the spring and be retained therein by the boot.

14. In a spring suspension, the combination of a hollow spring anchor, suitably packed to retain a lubricant, means for introducing a lubricant to the interior of the anchor, and a leaf spring having its large end clamped in the anchor and in position to come in contact with said oil.

15. In a spring suspension, the combination of a hollow spring anchor, a leaf spring having an end clamped in said anchor, a boot for fitting around the anchor casing and the spring, and means for introducing a lubricant into the hollow interior of the casing for coming in contact with the spring leaves.

In testimony whereof I have affixed my signature.

JAMES SCRIPPS BOOTH.